(12) United States Patent
Nguyen et al.

(10) Patent No.: US 7,246,190 B2
(45) Date of Patent: Jul. 17, 2007

(54) METHOD AND APPARATUS FOR BRINGING BUS LANES IN A COMPUTER SYSTEM USING A JUMPER BOARD

(75) Inventors: Vincent Nguyen, Houston, TX (US); Raghavan V. Venugopal, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 197 days.

(21) Appl. No.: 10/828,910

(22) Filed: Apr. 21, 2004

(65) Prior Publication Data
US 2005/0240703 A1   Oct. 27, 2005

(51) Int. Cl.
*G06F 13/36* (2006.01)
(52) U.S. Cl. .................. 710/306; 710/301; 370/402
(58) Field of Classification Search ............... 710/306; 345/502–505; 361/789
See application file for complete search history.

(56) References Cited

U.S. PATENT DOCUMENTS

| | | | | |
|---|---|---|---|---|
| 5,440,755 | A * | 8/1995 | Harwer et al. ............. | 710/315 |
| 5,524,232 | A * | 6/1996 | Hajeer ....................... | 711/115 |
| 5,572,688 | A * | 11/1996 | Sytwu ....................... | 710/301 |
| 5,884,053 | A * | 3/1999 | Clouser et al. ............ | 710/312 |
| 6,004,139 | A * | 12/1999 | Dramstad et al. .......... | 439/59 |
| 6,310,992 | B1 * | 10/2001 | Gehrke et al. .............. | 385/24 |
| 6,356,966 | B1 * | 3/2002 | Loach et al. ................ | 439/78 |
| 6,356,967 | B1 * | 3/2002 | Vaisanen et al. ........... | 710/300 |
| 6,446,170 | B1 * | 9/2002 | Chan et al. ................. | 711/132 |
| 6,477,603 | B1 * | 11/2002 | Locker et al. .............. | 710/301 |
| 6,533,587 | B1 * | 3/2003 | Potter et al. ................ | 439/65 |
| 6,780,018 | B1 * | 8/2004 | Shipe ......................... | 439/636 |
| 2003/0007338 | A1 * | 1/2003 | Brosowski ................. | 361/785 |
| 2003/0023803 | A1 * | 1/2003 | Zatorski ..................... | 710/306 |
| 2004/0088469 | A1 * | 5/2004 | Levy .......................... | 710/316 |
| 2004/0228932 | A1 * | 11/2004 | Pilgaonkar et al. ......... | 424/757 |
| 2005/0102454 | A1 * | 5/2005 | McAfee et al. ............ | 710/107 |
| 2006/0085585 | A1 * | 4/2006 | Wu et al. ................... | 710/306 |
| 2006/0098020 | A1 * | 5/2006 | Shen et al. ................. | 345/520 |

OTHER PUBLICATIONS

NXP N.V. NXP 2-lane channel switch. CBTU0808. Datasheet. Oct. 2006.*
Ngai, Henry. Lane Routing in PCI Express. Embedded Computing Design. Sep. 2005.*
Bhatt, Ajay V. Creating a PCI Express Interconnect. White Paper. 2002.*
"PCI Express* Board Design Guidelines," Draft, Intel Corporation, Jun. 2003, pp. 1-41.
"PCI Express Card Electromechanical Specification Revision 1.0a," Apr. 15, 2003, PCI Express, pp. 1-82.
"PCI Express Base Specification Revision 1.0a," Apr. 15, 2003, PCI Express, pp. 1-428.

* cited by examiner

*Primary Examiner*—Mark H. Rinehart
*Assistant Examiner*—Matthew Spittle

(57) ABSTRACT

Methods and apparatuses are disclosed for providing a bus in a computer system. In one embodiment, an apparatus comprises: a central processing unit (CPU), a bridge coupled to the CPU, a first slot configured to receive a device, where a first portion of the bridge is coupled to the first slot, a second slot configured to receive a device, where a second portion of the bridge is coupled to the second slot, and where inserting a jumper board into the first slot couples the first portion of the bridge to the second slot.

15 Claims, 6 Drawing Sheets

METHOD AND APPARATUS FOR BRINGING BUS LANES IN A COMPUTER SYSTEM USING A JUMPER BOARD

BACKGROUND

Computers are ubiquitous in today's society. Computer operating speed is related to the speed of the computer's processor. In general, processor speeds increase continually as the industry witnesses an ever increasing growth in the number of transistors per integrated circuit. As processor speeds increase, other devices coupled to the processor also increase their operating speed to gain the full advantage of increased processor speed. Buses, which are used to couple devices together, also increase in speed in order to provide the full advantage of the increased processor speed to the various devices in the system.

Computer companies strive to keep pace with the changing technology trends. In part, this endeavor includes making decisions based on consumer marketing trends as to which new technologies should be offered in the latest computers. However, consumer needs change rapidly as new technology becomes available. For example, a computer company may have already begun production on a computer system that implements a certain configuration of the bus (e.g., PCI-Express™), and midway through production consumer preferences may change so that consumers desire a different bus configuration. At this point in production, valuable market share may be lost if the computer company has to redesign the computer for a different bus. Accordingly, computers that contain the latest technology and are also adaptable to newer technology trends are desirable.

BRIEF SUMMARY

Methods and apparatuses are disclosed for providing a bus in a computer system. In one embodiment, an apparatus comprises: a central processing unit (CPU), a bridge coupled to the CPU, a first slot configured to receive a device, where a first portion of the bridge is coupled to the first slot, a second slot configured to receive a device, where a second portion of the bridge is coupled to the second slot, and where inserting a jumper board into the first slot couples the first portion of the bridge to the second slot.

BRIEF DESCRIPTION OF THE DRAWINGS

A better understanding of various embodiments of the present invention can be obtained when the following detailed description is considered in conjunction with the following drawings, in which.

DETAILED DESCRIPTION

Figure 1:
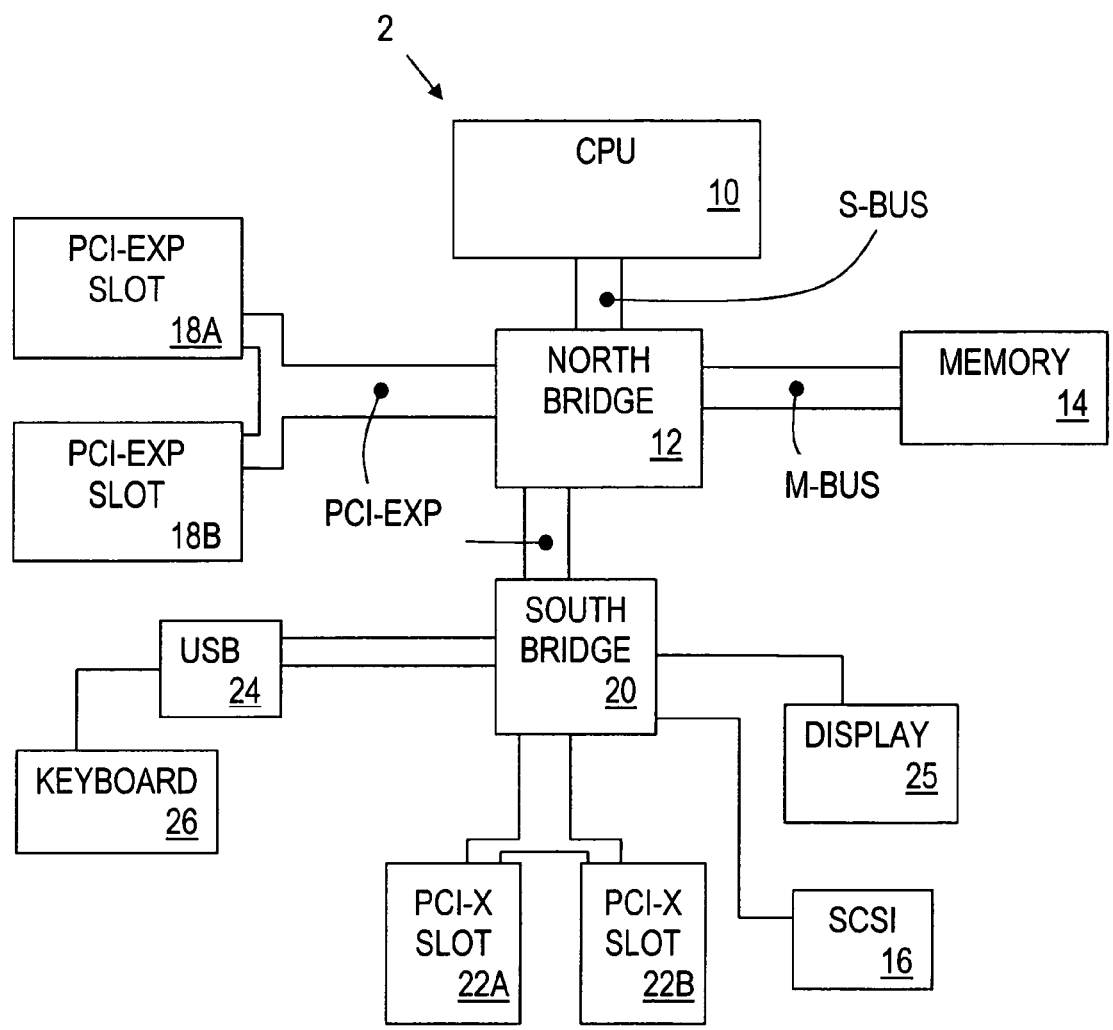
FIG. 1 illustrates an exemplary computer system.

FIG. 1 illustrates an exemplary computer system 2. The computer system of FIG. 1 includes a central processing unit (CPU) 10 that couples to a bridge logic device 12 via a system bus (S-BUS). Bridge logic device 12 is referred to as a "North bridge." Bridge 12 couples to a memory 14 by a memory bus (M-BUS).

Bridge 12 also couples to PCI-Express slots 18A–B using the PCI-Express™ bus standard as disclosed in "PCI-Express Base Specification 1.0a," available from the Peripheral Component Interconnect (PCI) Special Interest Group (PCI-SIG) and incorporated herein by reference. Slots 18A–B may physically reside on the same printed circuit board (also referred to as a "system board" or "mother board") as CPU 10. Alternatively slots 18A–B may be located on a riser or expansion board mounted on the system board. Many desktop computer systems provide ample space on the system board for slots 18A–B. In a rack mounted computer system however, where real estate on the system board may be limited, slots 18A–B may reside on a riser board that plugs into the system board. The configuration of slots 18A–B will be discussed in more detail below.

Additionally, bridge 12 couples to an additional bridge 20 (sometimes referred to as the "South bridge") using a PCI-Express bus. Bridge 20 is capable of providing for various different busing schemes. For example, bridge 20 couples to PCI-extended (PCI-X) slots 22A–B using a PCI-X bus and couples to a universal serial bus (USB) connector 24 via a USB. A keyboard 26 may be coupled to system 2 via USB connector 24. Bridge 20 also couples to a small computer system interconnect (SCSI) controller 16 that in turn connects to SCSI devices like the hard drives.

CPU 10 executes software stored in memory 14 or other storage devices. Under the direction of the software, CPU 10 may accept commands from an operator via keyboard 26 or an alternative input device, and may display desired information to the operator via a display 25 or an alternative output device. Bridge 12 coordinates the flow of data between components such as between CPU 10 and slots 18A–B.

Memory 14 stores software and data for rapid access and often complements the type of M-BUS implemented. For example, some busing standards use dual data rate (DDR) principles, and therefore memory 14 would then be DDR-compliant. The SCSI device 16 may be a controller that permits connection for additional storage devices to be accessed by system 2.

Bridge 20 coordinates the flow of data between bridge 12 and the various devices coupled to bridge 20. For example, signals from the keyboard 26 may be sent along the USB via USB connector 24 to bridge 20, and from bridge 20 to bridge 12 via the PCI-Express bus.

PCI-Express represents a recent trend in busing schemes to move away from a "shared" bus toward a point-to-point connection. That is, rather than a single parallel data bus through which all data is routed at a set rate (as is the case, for example, for PCI or PCI-X), a PCI-Express-compliant bus comprises a group of point-to-point conductors, in which data is sent serially and all the conductors are individually clocked. Although the focus of some of the Figures involves the PCI-Express bussing standard, other embodiments may include fiber optic and wireless communication links.

Figure 2:
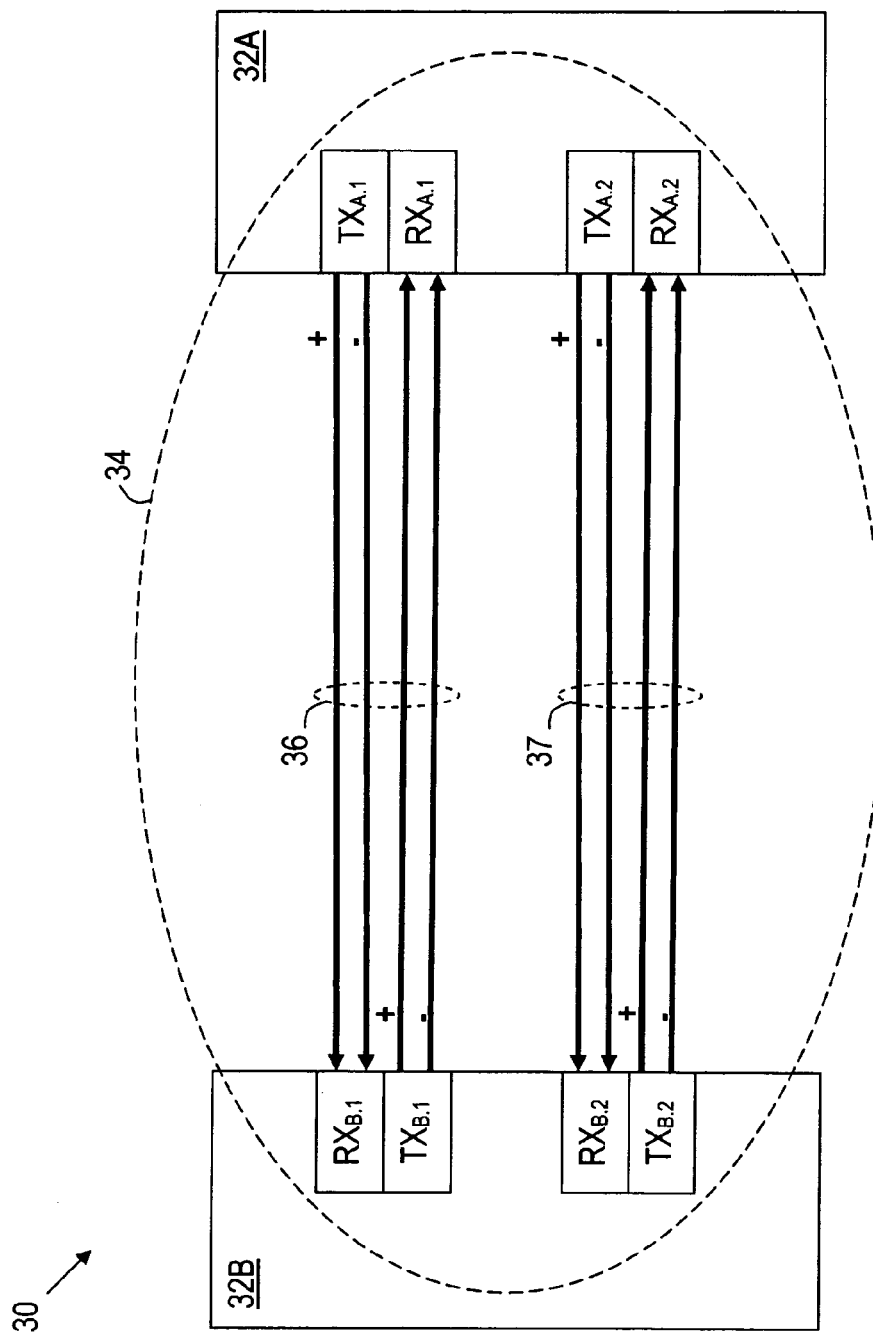
FIG. 2 illustrates an exemplary serial bus link.

FIG. 2 depicts an exemplary system 30 comprising devices 32A–B communicating with each other serially via a link 34. Accordingly, system 30 may implement the PCI-Express standard or any other standard capable of performing serial communications. Device 32A may be a PCI-Express compliant device inserted into slot 18A.

Device 32B may comprise a bridge that is PCI-Express compliant, such as bridge 12.

Device 32A includes a driver or transmitter $TX_{A.1}$ and device 32B includes a receiver $RX_{B.1}$. The connection between each transmitter and receiver in system 30 comprises a pair of differential signal lines, designated as + and − respectively. Although there are two lines between $TX_{A.1}$ and $RX_{B.1}$ carrying differential signals, the difference between the two differential signals yields a single signal of interest with a minimal amount of noise.

As indicated in FIG. 2 by the direction of the arrows, the lines between $TX_{A.1}$ and $RX_{B.1}$ communicate information from device 32A to device 32B. Similarly, device 32B communicates information to device 32A using transmitter $TX_{B.1}$ and receiver $RX_{A.1}$ as indicated by the arrows. In this manner, PCI-Express communication between devices 32A–B is often referred to as a "dual-simplex" because data is sent on one differential pair of data lines (i.e., the + and − lines connecting $TX_{A.1}$ and $RX_{B.1}$), and data is received on another differential pair of data lines (i.e., the + and − lines connecting $TX_{B.1}$ and $RX_{A.1}$). The two pairs of data lines that allow information to be conveyed back and forth between devices 32A–B are often referred to as "lanes." FIG. 2 shows the link 34 with one lane 36 coupled to transmitters $TX_{A.1}$ and $TX_{B.1}$ and also coupled to receivers $RX_{B.1}$ and $RX_{A.1}$. Likewise, link 34 includes another lane 37 coupled to transmitters $TX_{A.2}$ and $TX_{B.2}$ and also coupled to receivers $RX_{B.2}$ and $RX_{A.2}$. Although link 34 includes two lanes 36–37, any number of lanes are possible where the number of lanes contained therein determines the size of the link 34. For example, link 34 is shown containing the lanes 36–37 and therefore the link 34 is referred to as a "by two" link (sometimes denoted as "x2").

As discussed above with regard to FIG. 1, bridge 12 may interface to multiple bus technologies and therefore bridge 12 may provide a limited number of PCI-Express links. The actual number and size of the links that bridge 12 implements in practice often depends on industry trends. For example, bridge 12 may be implemented using an integrated circuit with a limited number of pins to support the multiple bus technologies. In order to support the various bus technologies using the limited number of pins, the number of PCI-Express links may be limited. As such, bridge 12 may be configured to provide one link to slots 18A–B and another link to bridge 20 as indicated in FIG. 1.

Figure 3A:
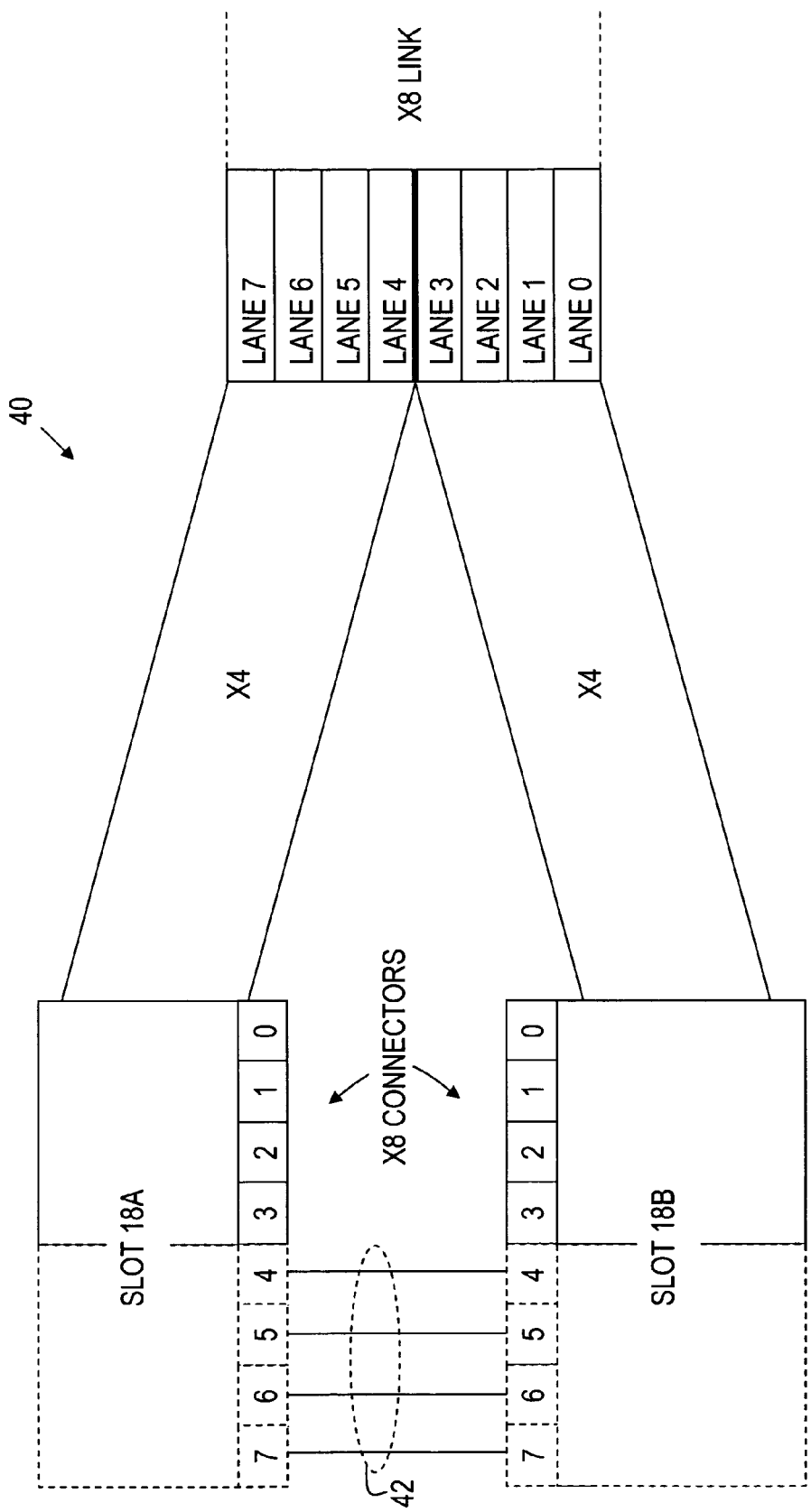
FIG. 3A illustrates an exemplary implementation of a serial bus link.

FIG. 3A depicts an exemplary system 40 where the bus or link is bifurcated into portions that are allocated among slots 18A–B, where marketing trends, customer requirements, or other considerations may indicate how the portions of the link should be allocated. For example, system 40 includes a x8 link with eight lanes numbered 0–7. The eight lanes in the x8 link are bifurcated into portions that are allocated among slots 18A–B, thereby providing two independent x4 links. Lanes 0–3 are routed to the slot 18B which enables the slot 18B to be a x4 link. Similarly, lanes 4–7 are routed to the slot 18A which enables the slot 18A to be a x4 link.

Although slots 18A–B in system 40 are configured as two x4 links, the physical connectors used to implement slots 18A–B may be made larger than the size of the link provided to slots 18A–B in order to support the full x8 input/output (I/O) adapters. That is, despite slots 18A–B being configured as x4 links, the connectors used to implement slots 18A–B may be x8 connectors so that each of slots 18A–B may be capable of supporting a x8 I/O adapters. The PCI-Express specification refers to this as "down shifting."

Table 1 below illustrates connections for slots 18A–B. As was illustrated in FIG. 2 with regard to the lanes 36–37, each PCI-Express lane comprises at least four pins, i.e., one set of + and − lines for receiving signals and another set of + and − lines for transmitting signals. Each of the connections referred to in Table 1 are capable of facilitating connection of a lane, and as such, each connection includes at least four pins. However, for sake of discussion, each connection in Table 1 will be referred to as making a single connection to a lane.

Referring to Table 1 and FIG. 3A, lanes 0–3 couple to connections 0–3 of the slot 18B respectively. Likewise, lanes 4–7 couple to connections 0–3 of the slot 18A respectively. In this manner, the x8 link is allocated so that slots 18A–B are capable of providing a x4 link to a device that is coupled to the slot 18B and a x4 link to a device that is coupled to the slot 18A. Connections 4–7 of slots 18A–B are shown as dashed lines indicating that connections 4–7 of slots 18A–B are not directly coupled to the lanes from the x8 link as described below.

TABLE 1

|  | Connection 0 | Connection 1 | Connection 2 | Connection 3 |
| --- | --- | --- | --- | --- |
| Slot 18B | Lane 0 | Lane 1 | Lane 2 | Lane 3 |
| Slot 18A | Lane 4 | Lane 5 | Lane 6 | Lane 7 |

Since slots 18A–B are configured as x4 links but implemented with x8 connectors, slots 18A–B are capable of utilizing the maximum capacity by configuring connections 4–7. For example, as shown in FIG. 3A, connections 4–7 of the slot 18A may couple directly to connections 4–7 of the slot 18B using traces 42. Traces 42 may be implemented on the same printed circuit board as slots 18A–B, i.e., the system board or a riser card that couples to the system board. Traces 42 may be used to re-route lanes from the x8 link to another slot. For example, by routing lanes 4–7 (which couple to connections 0–3 of slot 18A), to connections 4–7 of slot 18A, slot 18B may be transformed from a x4 link to a x8 link. That is, all of the lanes coming from the x8 link may be re-routed to a single slot. Similarly, by routing lanes 0–3 (which couple to connections 0–3 of slot 18B), to connections 4–7 of slot 18B, slot 18A may be transformed from a x4 link to a x8 link.

Figure 3B:
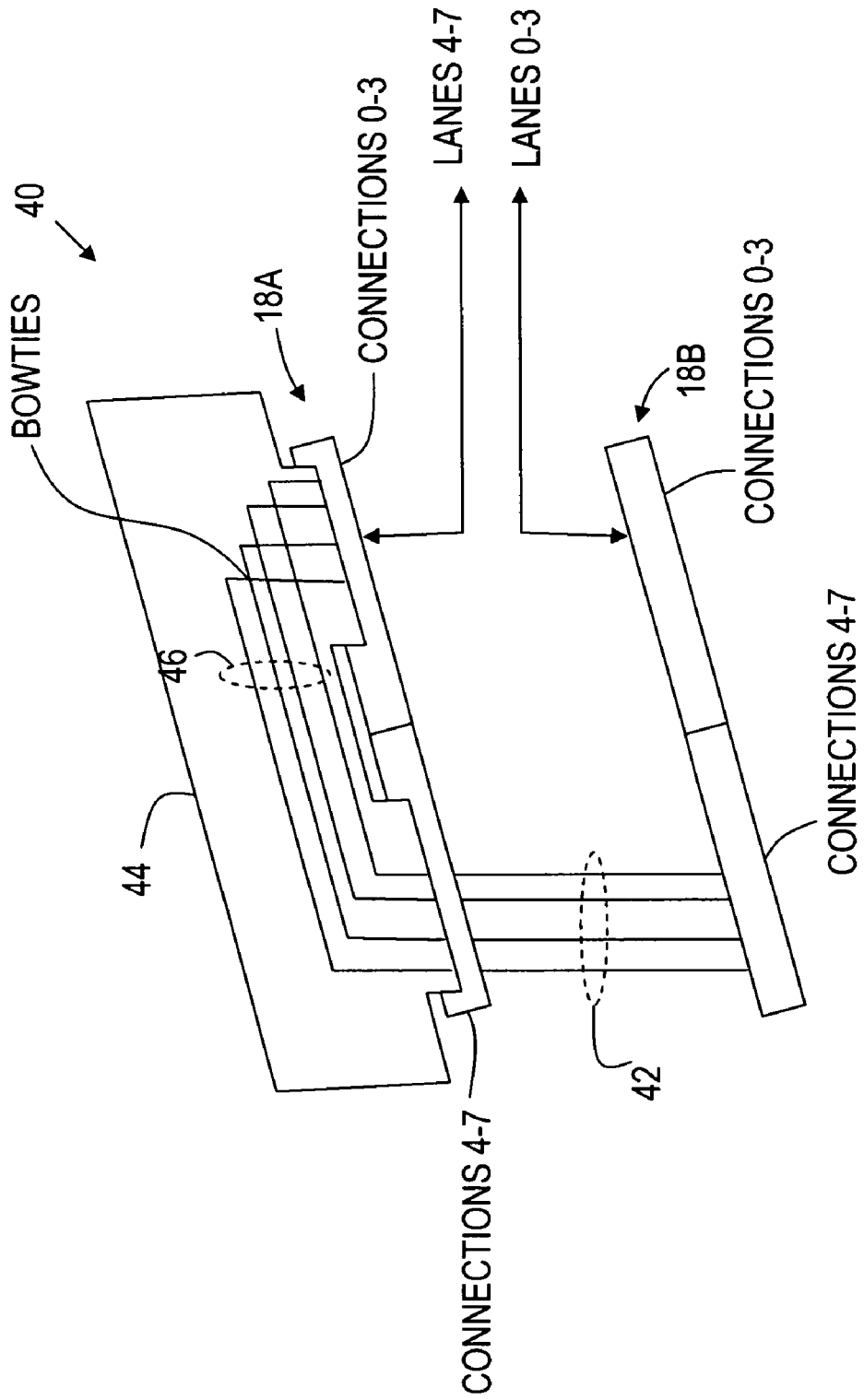
FIG. 3B illustrates an exemplary system including a jumper board.

FIG. 3B depicts a jumper board 44 that is inserted into slot 18A, which re-routes the incoming lanes 4–7 to traces 42 and thereby enables slot 18B to provide a full x8 link as explained below. Jumper board 44 includes traces 46 that couple connections 0–3 on slot 18A to connections 4–7 on slot 18A. Traces 46 cross each other, and these crossings are often referred to as "bowites," which will be described in more detail below. Lanes 4–7 directly couple to connections 0–3 of slot 18A (as indicated by the double sided arrow), and then further couple to connections 4–7 of slot 18A via traces 46. Connections 4–7 on slot 18A are coupled (via traces 42) to connections 4–7 of slot 18B, and therefore lanes 4–7 are indirectly coupled to connections 4–7 of slot 18B. Accordingly, lanes 0–7 of the original x8 link are reconstituted at slot 18B, allowing slot 18B to provide a x8 link. Similarly, by inserting the jumper board 44 into slot 18B, slot 18A is capable of providing a x8 link.

Figure 4:
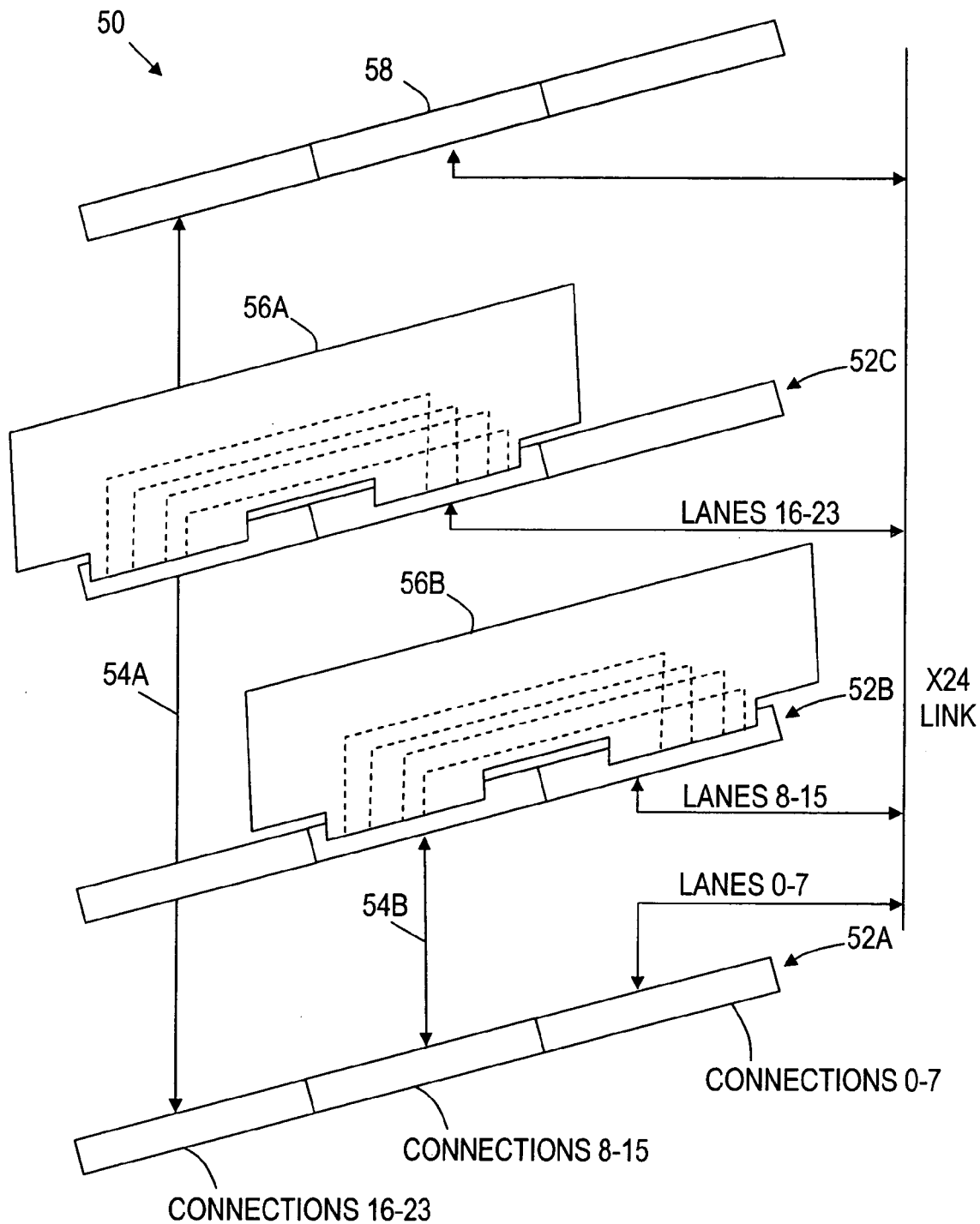
FIG. 4 illustrates another exemplary system including multiple jumper boards.

Although exemplary system 40 depicts a x8 link allocated among slots 18A–B, other embodiments are possible that implement different sized links. For example, FIG. 4 illustrates and exemplary system 50 including a x24 link that is allocated among three slots 52A–C. The exemplary system depicted in FIG. 4 is applicable to various serial bussing standards. Slots 52A–C are implemented using x24 connectors with connections 0–23. Lanes 0–7 of the x24 link are coupled to connections 0–7 of slot 52A. Lanes 8–15 of the x24 link are coupled to connections 0–7 of slot 52B. Lanes 16–23 of the x24 link are coupled to connections 8–15 of slot 52C. In this manner, although slots 52A–C are implemented using x24 connectors and are therefore capable of providing x24 links, each slot 52A–C is configured as a x8 link by default. Akin to system 40, system 50 includes traces 54A that couple connections 16–23 of slot 52C to connections 16–23 of slot 52A. System 50 also includes traces 54B that couple connections 8–15 of slot 52B to connections 8–15 of slot 52A.

By inserting jumper boards 56A and 56B in slots 52C and 52B respectively, slot 52A is capable of providing a x24 link. More specifically, lanes 16–23 of the x24 link (which are directly coupled to connections 8–15 of slot 52C), are coupled to connections 16–23 of slot 52A via jumper board 56A and traces 54A. Similarly, lanes 8–15 of the x24 link (which are directly coupled to connections 0–7 of slot 52B), are coupled to connections 8–15 of slot 52A via jumper board 56B and traces 54B. Consequently slot 52A is coupled, either directly or indirectly, to lanes 0–23 of the x24 link.

System 50 also comprises an auxiliary slot 58. In some embodiments, Slot 58 is coupled to the x24 link and may be reserved for use by a jumper board. In this manner, any one of slots 52A–C may be expanded (potentially to the full x24 link) by inserting one of the jumper boards 56A–B into slot 58, and therefore expand the ability of slots 52A–C to provide the full x24 link without consuming one of the slots 52A–C.

As described above, traces that couple the various slots together as well as the traces present on the jumper boards may cross each other creating what are know as bowties. For example, referring again to FIG. 3B, the traces that connect connections 0–3 of slot 18A to connections 4–7 of slot 18A cross each other and form bowties as indicated. Since the traces are routed on PCBs (i.e., either on a system board or a jumper board), bowtie connections may add to the total number of layers included in the PCB, which adds to PCB complexity and cost. However, by implementing two features of PCI-Express called "lane polarity inversion" and "lane reversal," crisscrossing of traces may be minimized and the cost and complexity of the system board and the jumper board may be minimized.

With lane polarity inversion, the receiving device (e.g., devices 32A–B in FIG. 2) inverts the data received on the differential signal lines instead of physically crossing the lines on the PCB. That is, a lane will function properly even if a +signal line from the transmitter is connected to the −signal on the receiver and vice versa.

Lane reversal may be thought of as a lane reordering. Effectively, lane reversal allows for the transmitting and receiving devices to reorder which lanes correspond to a particular transmit-receive pair. For example in FIG. 2, if $TX_{A.1}$ and $RX_{A.1}$ on device 32A are supposed to connect to $RX_{B.2}$ and $TX_{B.2}$ on device 32B respectively, device 32B may electronically assign $RX_{B.1}$ and $TX_{B.1}$ to take the place of $RX_{B.2}$ and $TX_{B.2}$ and receive the signals from $TX_{A.1}$ and $RX_{A.1}$.

Figure 5:
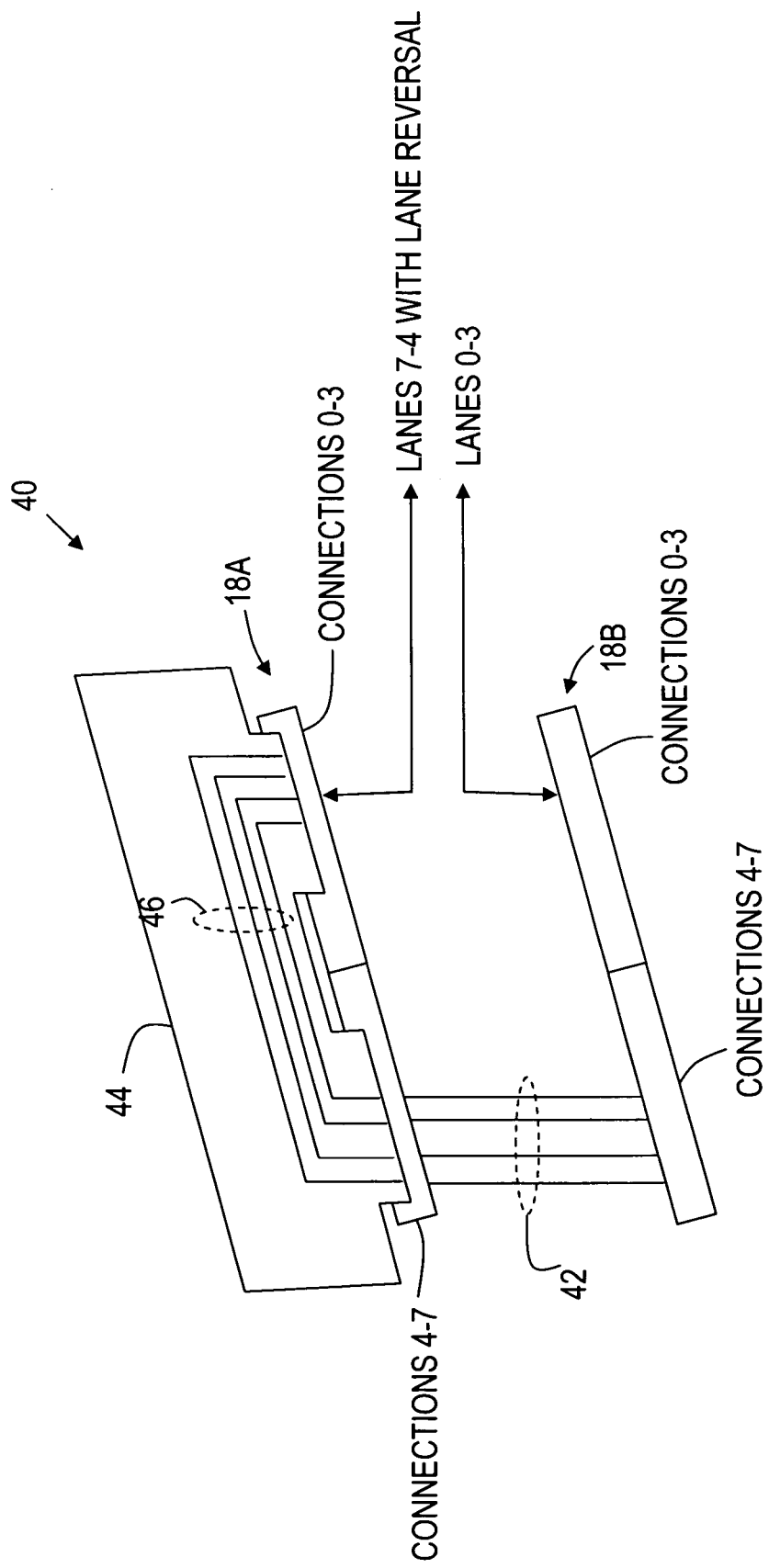
FIG. 5 illustrates another exemplary system including a jumper board.

FIG. 5 illustrates the system shown in FIG. 3B where lane reversal is implemented in lanes 4–7. By reversing the lanes as shown, connection 0 of slot 18A may be routed to connection 7 of slot 18. Similarly, connection 1 of slot 18A may be routed to connection 6 of slot 18B; connection 2 of slot 18A may be routed to connection 5 of slot 18A; and connection 3 of slot 18A may be routed to connection 4 of slot 18A. In this manner, the need for traces crossing each other, and thereby creating bowties, is eliminated and the complexity of the jumper board may be reduced. Although lane reversal was shown for lanes 4–7, lanes 0–3 may be reversed to reduce the complexity of a jumper board inserted in slot 18B. In either case, the jumper board may be inserted into either slot 18A, thereby expanding slot 18B to a x8 connection, or the jumper board may be inserted into slot 18B, thereby expanding slot 18A to a x8 connection.

While various embodiments of the present invention have been shown and described, modifications thereof can be made by one skilled in the art without departing from the spirit and teachings of the invention. For example, any size bus may be bifurcated among multiple slots and multiple jumper boards may be used to enable slots to support the full size of the bus. Further, although FIG. 2 discloses differential communication between devices 32A–B, single ended communication is also possible. In addition, the principles disclosed above are equally applicable to wireless and fiber optic links. For example, referring to FIG. 3B, Lanes 4–7 and Lanes 0–3 may comprise two portions of a fiber optic link. In this example, traces 42, which reroute Lanes 4–7 from slot 18A over to slot 18B, may be implemented using fiber optic lines rather than electrical conductors.

The embodiments described herein are exemplary only, and are not intended to be limiting. Accordingly, the scope of protection is not limited by the description set out above. Each and every claim is incorporated into the specification as an embodiment of the present invention.

What is claimed is:

1. A computer system, comprising:
   a central processing unit (CPU);
   a bridge coupled to the CPU for providing a bus;
   a first slot configured to receive a device, wherein a first set of lanes of the bus is coupled to the first slot;
   a second slot configured to receive a device, wherein a second and different set of lanes of the same bus is coupled to the second slot;
   at least one trace coupled to the first and second slots;
   wherein the computer system is configured so that inserting a jumper board in the first slot couples the first set of lanes of the bus to the second slot via the at least one trace, while the jumper board does not occupy the second slot; and
   wherein the slots are implemented together on a board other than the jumper board.

2. The computer system of claim 1, wherein each slot is capable of providing all signals pertaining to the bus.

3. A computer system, comprising:
   a central processing unit (CPU);
   a bridge coupled to the CPU for providing a bus;
   a first slot configured to receive a device, wherein a first set of lanes of the bus is coupled to the first slot;
   a second slot configured to receive a device, wherein a second and different set of lanes of the same bus is coupled to the second slot;
   at least one trace coupled to the first and second slots; and
   a jumper board;
   wherein the computer system is configured so that inserting the jumper board in the first slot couples the first set of lanes of the bus to the second slot, wherein the slots are implemented on a riser board.

4. The computer system of claim 3, wherein lane polarity inversion techniques are implemented on a printed circuit board that includes the first and second slots.

5. The computer system of claim 3, wherein lane reversal techniques are implemented on a printed circuit board that includes the first and second slots.

6. A computer system, comprising:
a central processing unit (CPU);
a bridge coupled to the CPU for providing a bus;
a first slot configured to receive a device, wherein a first set of lanes of the bus is coupled to the first slot;
a second slot configured to receive a device, wherein a second and different set of lanes of the same bus is coupled to the second slot;
at least one trace coupled to the first and second slots;
wherein the computer system is configured so that inserting a jumper board in the first slot couples the first set of lanes of the bus to the second slot, wherein the first and second sets of lanes of the bus each form a serial bus; and
wherein the slots are implemented together on a board other than the jumper board.

7. The computer system of claim 6, wherein the serial bus comprises an optical bus.

8. The computer system of claim 6, wherein the serial bus is a PCI-Express bus.

9. The computer system of claim 6, wherein the slots do not provide connections for all signals pertaining to the bus without the jumper board.

10. A method of providing a bus in a computer system comprising:
routing a first portion of the bus to a first segment of a first slot;
routing a second and different portion of the same bus to a first segment of a second slot;
coupling a second segment of the first slot via at least one trace to a second segment of the second slot; and
inserting a jumper board into the first slot;
wherein the slots are implemented together on a board other than the jumper board; and
wherein the jumper board connects the first and second segments of the first slot, thereby routing the first portion of the bus to the second slot via the at least one trace, while the jumper board does not occupy the second slot.

11. The method of claim 10, wherein the first and second portions of the bus comprise the entire bus.

12. The method of claim 10, further comprising selecting the first and second slots, from among several available slot configurations, to correspond to a maximum number of physical lanes of the bus.

13. The method of claim 10, further comprising adjusting the first and second slots such that they can physically accommodate more than just the first and second portions.

14. The method of claim 13, wherein the first and second slots are capable of providing all signals that pertain to the entire bus.

15. The method of claim 10, wherein the connection between slots occurs on a system board.

* * * * *

UNITED STATES PATENT AND TRADEMARK OFFICE
CERTIFICATE OF CORRECTION

| | | |
|---|---|---|
| PATENT NO. | : 7,246,190 B2 | Page 1 of 1 |
| APPLICATION NO. | : 10/828910 | |
| DATED | : July 17, 2007 | |
| INVENTOR(S) | : Vincent Nguyen et al. | |

It is certified that error appears in the above-identified patent and that said Letters Patent is hereby corrected as shown below:

In column 7, line 27, in Claim 10, after "system" insert -- , --.

Signed and Sealed this

First Day of September, 2009

David J. Kappos
*Director of the United States Patent and Trademark Office*